(12) United States Patent
Fushiki (10) Patent No.: US 10,322,659 B2
(45) Date of Patent: Jun. 18, 2019

(54) HAULAGE VEHICLE

(71) Applicants: Hitachi Construction Machinery Co., Ltd., Taito-ku, Tokyo (JP); Takako Fushiki

(72) Inventor: Michio Fushiki, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/555,887

(22) PCT Filed: Mar. 30, 2016

(86) PCT No.: PCT/JP2016/060548
§ 371 (c)(1),
(2) Date: Sep. 5, 2017

(87) PCT Pub. No.: WO2017/168661
PCT Pub. Date: Oct. 5, 2017

(65) Prior Publication Data
US 2018/0111536 A1   Apr. 26, 2018

(51) Int. Cl.
*B60P 1/16* (2006.01)
*B60P 1/04* (2006.01)
*G01L 5/00* (2006.01)

(52) U.S. Cl.
CPC .................. *B60P 1/16* (2013.01); *B60P 1/04* (2013.01); *G01L 5/0061* (2013.01)

(58) Field of Classification Search
CPC ............. B60P 1/04; B60P 1/16; G01L 5/0061
USPC ....................................... 298/22 C
See application file for complete search history.

(56) References Cited

U.S. PATENT DOCUMENTS

| | | | | |
|---|---|---|---|---|
| 3,640,578 A | * | 2/1972 | Finney ................. | B60G 17/005 298/17 S |
| 3,921,128 A | * | 11/1975 | Snead ..................... | B60P 1/045 180/282 |
| 4,216,996 A | * | 8/1980 | Pitts ........................ | B60P 1/045 188/29 |
| 4,682,145 A | * | 7/1987 | Brawner, Jr. ............ | G01C 9/14 180/282 |

(Continued)

FOREIGN PATENT DOCUMENTS

| | | | | |
|---|---|---|---|---|
| GB | 2536065 A | * | 9/2016 | .............. B60P 1/045 |
| GB | 2536066 A | * | 9/2016 | .............. B60P 1/045 |

(Continued)

OTHER PUBLICATIONS

Machine translation of JP '391 from PAJ, jplatpat (Year: 2013).*

*Primary Examiner* — Hilary L Gutman
(74) *Attorney, Agent, or Firm* — Crowell & Moring LLP (57) ABSTRACT

An object of the present invention is to provide a haulage vehicle that enables precisely confirming that work for dumping a load is completed.
The present invention is based upon a haulage vehicle provided with a vehicle frame (2), a vessel (7) tiltably mounted on the vehicle frame and a hoist cylinder (9) which is provided between the vehicle frame and the vessel and which tilts the vessel, and has a characteristic that a load detector (39A, 39B, 23a) that detects force that acts in an extended or a contracted direction of the hoist cylinder and an empty load determination unit (23b) that determines whether the vessel is empty on the basis of a detection signal from the load detector or not are provided.

3 Claims, 6 Drawing Sheets

(56) References Cited

U.S. PATENT DOCUMENTS

| | | | |
|---|---|---|---|
| 4,691,792 A | 9/1987 | Shintani | |
| 4,988,974 A * | 1/1991 | Fury | B60P 1/045 |
| | | | 280/432 |
| 7,247,803 B2 * | 7/2007 | Takeda | B60G 5/04 |
| | | | 177/136 |
| 7,980,636 B2 * | 7/2011 | Miller | B60P 1/56 |
| | | | 298/29 |
| 8,700,274 B1 * | 4/2014 | Tejeda | B60P 1/283 |
| | | | 701/50 |
| 9,902,397 B2 * | 2/2018 | Ohsugi | B60T 7/22 |
| 10,076,989 B2 * | 9/2018 | Baldys | B60P 1/045 |
| 2010/0084908 A1 | 4/2010 | Montocchio | |
| 2011/0198912 A1 * | 8/2011 | Bibeau | B60P 1/045 |
| | | | 298/19 B |
| 2014/0152073 A1 | 6/2014 | Nakate et al. | |
| 2016/0264134 A1 * | 9/2016 | Ohsugi | B60W 30/095 |

FOREIGN PATENT DOCUMENTS

| | | |
|---|---|---|
| JP | 55-72428 A | 5/1980 |
| JP | 61-34425 A | 2/1986 |
| JP | 5-221258 A | 8/1993 |
| JP | 11-291881 A | 10/1999 |
| JP | 2001-105956 A | 4/2001 |
| JP | 2010-89778 A | 4/2010 |
| JP | 2011-225111 A | 11/2011 |
| JP | 2013-28306 A | 2/2013 |
| JP | 5254685 B2 | 8/2013 |
| JP | 2013-169931 A | 9/2013 |
| JP | 5844475 B1 | 1/2016 |
| WO | WO 2013/073325 A1 | 4/2015 |

\* cited by examiner

HAULAGE VEHICLE

TECHNICAL FIELD

The present invention relates to a haulage vehicle such as a large-sized dump truck operated in a mine.

BACKGROUND ART

A large-sized dump truck operated in a mine, for example, for a haulage vehicle is provided with an operator cab in a position on the front side of a vehicle frame equipped with wheels and is provided with a vessel (body) for loading ore, rock, earth and others on the rear side of the operator cab. The vessel is coupled by hinge pins in a position on the rear side of the vehicle frame. Besides, a hoist cylinder is provided between the vehicle frame and the vessel and the vessel is tilted by driving the hoist cylinder.

After the dump truck loads a load such as earth onto the vessel in a loading location, it travels to a dumping location and dumps the load. An operator operates a control lever in the operator cab and tilts the vessel so as to dump the load (refer to a patent literature 1). The control lever can be tilted to a pushing-up position for pushing up the vessel, to a holding position for holding a tilted state of the vessel, to a floating position for pushing down the vessel with self-weight and to a pulling-down position for forcedly pulling down the vessel.

The operator tilts the control lever to the pushing-up position so as to push up the vessel up to an optimum angle to dump earth as a load from the vessel. Afterward, the operator tilts the control lever to the holding position so as to hold the vessel in that angular position by predetermined time. When dumping work is completed, the operator tilts the control lever to the floating position (or tilts it to the pulling-down position) so as to seat the vessel on the vehicle frame.

Besides, as disclosed in a patent literature 2 for example, technique for automatically controlling pushing-up operation and pulling-down operation of a vessel for dumping work is known. This patent literature 2 is the technique that when set time elapses, the vessel is pulled down.

CITATION LIST

Patent Literature

PATENT LITERATURE 1: JP-A No. 2001-105956
PATENT LITERATURE 2: JP-A No. 1993-221258
PATENT LITERATURE 3: Japanese Patent No. 5254685

SUMMARY OF INVENTION

Technical Problem

When an operator operates the control lever so as to perform dumping work as in the patent literature 1, a backward field of view from the operator cab is not necessarily satisfactory and the patent literature 1 has a problem that it is difficult for the operator to precisely grasp whether the dumping work is completed from the inside of the operator cab or not. Besides, as such control that the vessel is pulled down when the set time elapses is made in the patent literature 2, no consideration according to a type of a load for dumping work is made.

More detailedly, dumping earth is made because the earth slides down on a bottom of the tilted vessel and accordingly, depending upon a type and a state of the earth, dumping time greatly varies. For example, as sandy or gravelly soil readily fluidifies, such soil can be readily dumped, however, in the case of clayey soil, especially in the case of viscous soil including moisture, such the soil adheres to the bottom of the vessel, and dumping such the soil requires long time. Therefore, according to the patent literature 2, depending upon a type of a load, a case that dumping work is already completed before the set time elapses and a case that dumping work is not completed yet after the set time elapses occur. Therefore, the patent literature 2 also has the above-mentioned problem that completion of dumping work cannot be precisely grasped.

The present invention is made in view of the above-mentioned and its object is to provide a haulage vehicle that enables precisely confirming that work for dumping a load is completed.

Solution to Problem

To achieve the object, the present invention is based upon a haulage vehicle provided with a vehicle frame, a vessel tiltably mounted on the vehicle frame and a hoist cylinder provided between the vehicle frame and the vessel for tilting the vessel, and has a characteristic that a load detector that detects force that acts in an extended or a contracted direction of the hoist cylinder and an empty load determination unit that determines whether the vessel is empty on the basis of a detection signal from the load detector or not are provided.

Advantageous Effects of Invention

According to the present invention, it can be precisely grasped that work for dumping earth as a load is completed. A problem, a configuration and effects except the above-mentioned will be clarified by description of the following embodiments.

DESCRIPTION OF EMBODIMENTS

Referring to the drawings, embodiments of the present invention will be described below. First, referring to FIGS. 1 and 2 for one example of a haulage vehicle, a configuration of a dump truck 1 for a mine will be described. The present invention can be generally applied to another haulage vehicle tiltably provided with a vessel for housing various loads on a vehicle frame.

The dump truck 1 is provided with a vehicle frame 2, and right and left front wheels 3 and right and left rear wheels 4 are attached to the vehicle frame 2. For a power source, an engine 5 is used and the engine 5 is installed on the vehicle frame 2. A reference numeral 6 denotes an operator cab for housing an operator who operates the dump truck 1 and the operator cab 6 is provided in a position on the front side of an upper part of the vehicle frame 2.

A vessel 7 is provided to the vehicle frame 2. The vessel 7 is a box-type container the upside of which is open and a load such as earth and crushed stone is loaded inside the vessel 7. The vessel 7 is coupled to the vehicle frame 2 by hinge pins 8 in a part on the rear end side and can be displaced from loading posture (see FIG. 1) substantially parallel to the vehicle frame 2 to dumping posture (see FIG. 2) tilted by a predetermined angle after being tilted backward with the hinge pins 8 in the center. When the vessel 7 is located in the loading posture, the vessel 7 is seated on a seat 10 provided to the vehicle frame 2.

Figure 1:
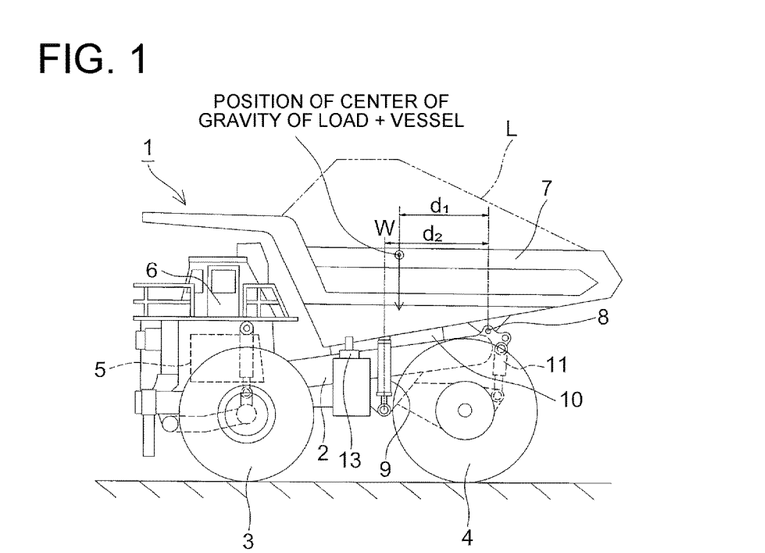
FIG. 1 is a side view showing a state in which a vessel of a mining dump truck showing one example of a haulage vehicle is located in loading posture.
Figure 2:
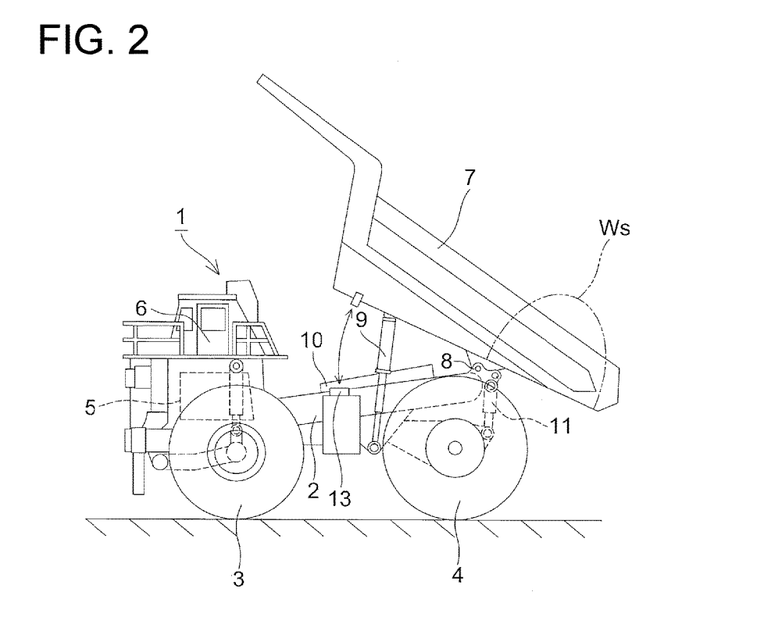
FIG. 2 is a side view showing a state in which the vessel of the dump truck shown in FIG. 1 is located in dumping posture.

To tilt the vessel 7, hoist cylinders 9 are inserted between the vehicle frame 2 and the vessel 7. As for the hoist cylinders 9, a pair of right and left hoist cylinders are provided, when the hoist cylinders 9 are extended, the vessel 7 is pushed up, and when the hoist cylinders are contracted, the vessel 7 is pulled down. In FIGS. 1 and 2, a reference numeral 11 denotes suspension cylinders.

Figure 3A:
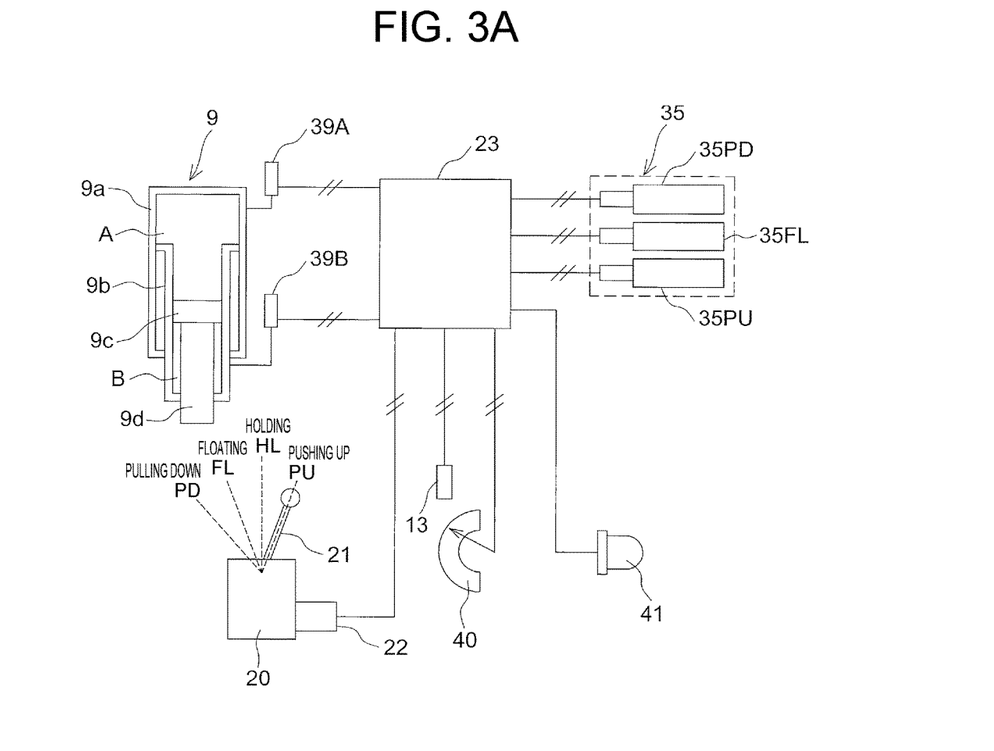
FIG. 3A illustrates a configuration of an operating mechanism of a hoist cylinder

Next, an operating mechanism of the hoist cylinders 9 will be described referring to FIG. 3A, 3B. As shown in FIG. 3A, a reference numeral 20 denotes an operation device and the operation device 20 is provided in the operator cab 6 of the dump truck 1. The operation device 20 is provided with a control lever 21 as operating means and an operation command output unit 22, and the operation command output unit 22 is connected to a controller 23. The control lever 21 can be tilted to a holding position HL in which the control lever 21 is in a perpendicular state, to a pushing-up position PU in which the control lever 21 is in a tilted state, to a pulling-down position PD in which the control lever 21 is in a tilted state and to a floating position FL between the holding position HL and the pulling-down position PD. The operation command output unit 22 outputs an electric signal corresponding to any of these positions to the controller 23 as an operation command.

Figure 3B:
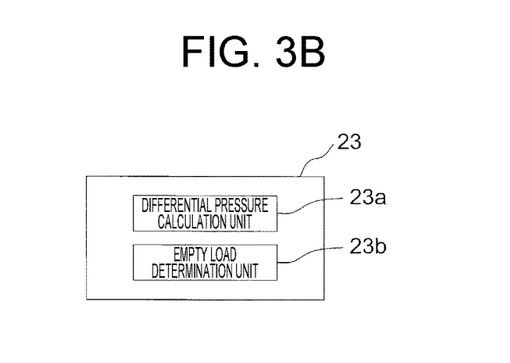
FIG. 3B is a block diagram showing an internal configuration of a controller.

As shown in FIG. 3B, the controller 23 is configured to output the operation command to a proportional solenoid valve unit 35 (proportional solenoid valves 35PD, 35FL, 35PU), and the controller is provided with a differential pressure calculation unit 23a that calculates differential pressure between an oil chamber A on the head side and an oil chamber B on the rod side of the hoist cylinders 9 and an empty load determination unit 23b that determines whether the vessel 7 is empty or not on the basis of a calculation result of the differential pressure calculation unit 23a. The details of empty load determination will be described later.

Next, an oil pressure control system for driving the hoist cylinders 9 will be described referring to FIG. 4. The hoist cylinders 9 are configured by multistage (for example, two-stage) hydraulic cylinders and the hydraulic cylinder is configured by an outer cylinder 9a located on the outside, an inner cylinder 9b which is telescopically provided inside the outer cylinder 9a and which partitions the inside of the outer cylinder 9a into the oil chamber A on the head side (on the extended side) and the oil chamber B on the rod side (on the contracted side), a piston 9c and a piston rod 9d respectively telescopically provided in the inner cylinder 9b.

When the control lever 21 is located in the pushing-up position PU, as a result that pressure oil is taken in the oil chamber A of the hoist cylinders 9 and the oil chamber B is held at tank pressure, the hoist cylinders 9 are extended, and the vessel 7 is pushed up. Besides, when the control lever 21 is located in the pulling-down position PD, as pressure oil is taken in the oil chamber B and the oil chamber A is held at tank pressure, the hoist cylinders 9 are contracted and the vessel 7 is pulled down. When the control lever 21 is located in the holding position HL, pressure oil is taken in the oil chamber A and the oil chamber B and operation of the piston 9c is locked. Consequently, the hoist cylinders 9 are not extended and are not contracted, and posture of the vessel 7 is held. Moreover, when the control lever 21 is located in the floating position FL, the oil chamber A and the oil chamber B of the hoist cylinders 9 are held at tank pressure. Therefore, the vessel 7 can be pushed down with self-weight.

Figure 4:
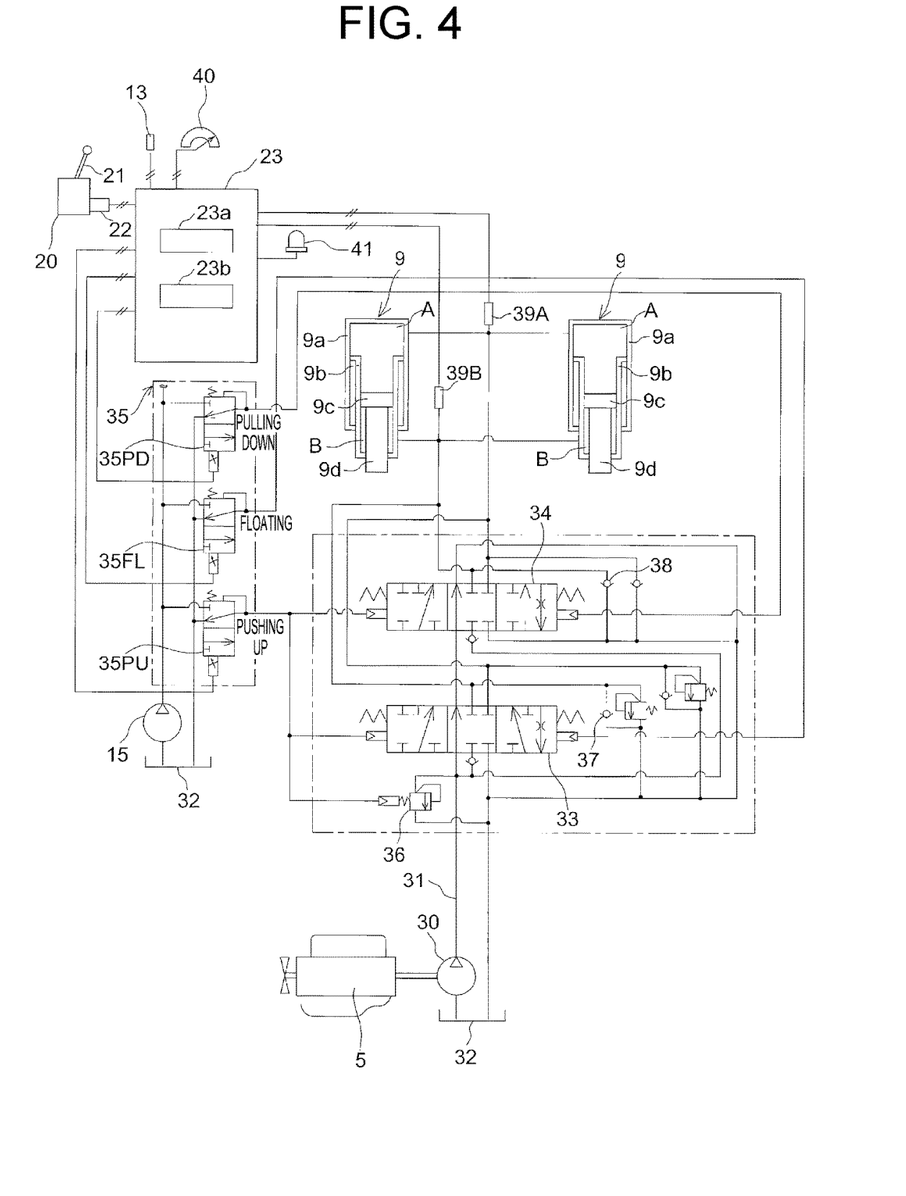
FIG. 4 is a block diagram showing a hydraulic control system of the hoist cylinder.

In FIG. 4, a reference numeral 30 denotes a hydraulic pump connected to high-pressure piping 31 for supplying pressure oil to the hoist cylinders 9 and the hydraulic pump is driven by the engine 5. Double control valves 33, 34 are inserted between the hydraulic pump 30 (a hydraulic oil tank 32) and the hoist cylinders 9. These control valves 33, 34 are switched according to a signal from the controller 23 to which the operation device 20 is connected.

In a hydraulic circuit shown in FIG. 4, the control valves 33, 34 are respectively provided with three positions and when the control lever 21 is located in the holding position HL, these control valves 33, 34 are respectively held in a central neutral position. When the control lever 21 is tilted in either of a right or left direction from the holding position HL, the control valves 33, 34 are respectively switched to a right or left switched position according to a hydraulic pilot signal. An electric signal is output from the controller 23. Therefore, the proportional solenoid valve unit 35 is inserted between a channel from a pilot pump 15 and each pilot part of the control valves 33, 34 and the proportional solenoid valve unit controls the supply of pilot pressure to the hydraulic pilot parts on both sides of each control valve 33, 34.

The proportional solenoid valve unit 35 is configured by the three proportional solenoid valves 35PD, 35FL and 35PU and is used for controlling a flow rate of hydraulic oil to be supplied to the hoist cylinders 9. When the control lever 21 is located in the holding position HL, both the oil chamber A and the oil chamber B in the hoist cylinders 9 are connected to the hydraulic pump 30 and the hydraulic oil tank 32. The output side of each proportional solenoid valve 35PD, 35FL, 35PU is connected to the hydraulic oil tank 32. Therefore, in the holding position HL, pressure oil from the hydraulic pump 30 is taken in the oil chamber A and the oil chamber B.

When a control signal (an operation command) from the controller 23 is input, any of the proportional solenoid valves 35PD, 35FL, 35PU is switched as a switched position. Pilot pressure is supplied to either of the right or left pilot part of each control valve 33, 34 and the control valves 33, 34 are respectively switched to a right or left switched position from the neutral position.

When the control lever 21 located in the holding position HL is tilted to the pushing-up position PU, the proportional solenoid valve 35PU is switched, pilot pressure is supplied to the left pilot part in FIG. 4 of each control valve 33, 34, and the control valves 33, 34 respectively located in the neutral position are switched to each left switched position.

Hereby, the oil chamber A of the hoist cylinders 9 is connected to the hydraulic pump 30 and the oil chamber B is connected to the hydraulic oil tank 32. Consequently, the hoist cylinders 9 are extended and the vessel 7 is pushed up.

In this case, a restrictor is formed in a channel on the side connected to the hydraulic oil tank 32 of each control valve 33, 34 and the vessel 7 can be prevented from being rapidly operated by generating back pressure to return oil from the hoist cylinders 9 to the hydraulic oil tank 32 owing to the restrictor. In FIG. 4, a reference numeral 36 denotes a pressure relief valve for protecting the control valves 33, 34 from excessive pressure. Besides, reference numerals 37, 38 denote a check valve for a makeup.

When the control lever 21 is tilted to the pulling-down position PD via the floating position FL, the proportional solenoid valve 35PD is switched and the control valve 34 is switched from the neutral position to a right switched position. Hereby, pressure of the hydraulic pump 30 is applied to the oil chamber B of the hoist cylinders 9 and the oil chamber A is connected to the hydraulic oil tank 32. Consequently, the hoist cylinders 9 are contracted and the vessel 7 is pulled down. At this time, the control valve 33 is held in the neutral position.

When the control lever 21 is operated to be in the floating position FL, the proportional solenoid valve 35FL is switched. In this case, only the control valve 33 is switched to a right switched position in FIG. 4, consequently, both oil chambers A, B of the hoist cylinders 9 are connected to the hydraulic oil tank 32, and pressure oil from the hydraulic pump 30 is returned to the hydraulic oil tank 32.

When the vessel 7 is seated on the seat 10 and the control lever 21 is held in the floating position FL, the hoist cylinders 9 are stably held in a contracted state with the self-weight of the vessel 7. This state is the loading posture of the vessel 7, a load such as earth can be loaded onto the dump truck 1, ore, earth and others are mined in a loading location, and they are loaded onto the vessel 7 of the dump truck 1.

When loading onto the dump truck 1 is completed, the dump truck 1 travels to a dumping location such as ore storage space in such a state that the load L is loaded, however, at this time, the vessel 7 is also kept in loading posture.

When the dump truck 1 reaches the dumping location, an operator operates the control lever 21. The operation command output unit 22 outputs an operation command corresponding to a position of the control lever 21 and the controller 23 switches the proportional solenoid valve 35PU according to the operation command so as to supply pressure oil from the pilot pump 15 to a hydraulic pilot part of the proportional solenoid valve unit 35 as pilot pressure. Consequently, as the control valves 33, 34 are switched, pressure oil from the hydraulic pump 30 is supplied to the oil chamber A of the hoist cylinders 9 and the oil chamber B is connected to the hydraulic oil tank 32, the hoist cylinders 9 are extended. Accordingly, the vessel 7 is turned the dumping posture for tilting the vessel backward with the hinge pins 8 in the center and the load L in the vessel 7 is dumped backward.

When the load L is earth, the earth is dumped downward from a rear end of the vessel 7. This is dumping and when dumping is completed, the vessel 7 is turned empty. In dumping, dumping of earth from the vessel 7 can be promoted by traveling the dump truck 1. Besides, the vessel 7 is held in a desired tilt angle position by switching the control lever 21 to the holding position HL when the vessel 7 is tilted to a maximum angle or on the way of pushing up.

Dumping speed of earth from the vessel 7 can be regulated by suitably setting a tilt angle of the vessel 7.

When dumping from the vessel 7 is completed, the hoist cylinders 9 are contracted by tilting the control lever 21 to the pulling-down position PD so as to pull down the vessel 7. Hereby, the vessel 7 is restored in a seated state in which a bottom of the vessel is in contact with the seat 10 provided to the vehicle frame 2. The vessel is also seated on the seat 10 with the self-weight of the vessel 7 by tilting the control lever 21 to the floating position FL without tilting the control lever 21 to the pulling-down position PD. Back pressure is generated because return oil from the hoist cylinders 9 passes the orifice of each control valve 33, 34, the vessel 7 does not lower rapidly, and accordingly, the vessel never strongly collides with the seat 10.

Incidentally, a backward field of view from the operator cab 6 of the dump truck 1 is not satisfactory and during dumping, an operator can normally see only the bottom of the vessel 7. Therefore, the operator cannot precisely grasp that earth is completely dumped from the vessel 7 by visual observation from the operator cab 6.

Therefore, it is extremely important for an operator to recognize time when dumping is completed. The operator should not move the dump truck 1 from the dumping location, should not return it to the loading location, and should not move it to another location respectively in such a state that earth remains in the vessel 7, that is, in such a state that a load is left. Therefore, it is required to extend dumping time to some extent. However, it should avoid from a viewpoint of working efficiency to perform dumping work for longer time than required.

Then, in this embodiment, an operator can recognize completion of dumping from the vessel 7 on the basis of a determination result of an empty load determination unit 23b (see FIG. 3B) in the operator cab 6. The details of determination by the empty load determination unit 23b of whether the vessel 7 is empty or not will be described below.

When horizontal distance from a position of the hinge pin 8 to a position of the center of gravity of the vessel 7 is d1 and horizontal distance from the position of the hinge pin 8 to a position in which the hoist cylinders 9 are connected is d2 in FIG. 1, force to work on the hoist cylinders 9 is "W×d1/d2" in such a state that the vessel 7 is horizontal if total weight of weight of the load L and the self-weight of the vessel 7 is W.

Figure 5:
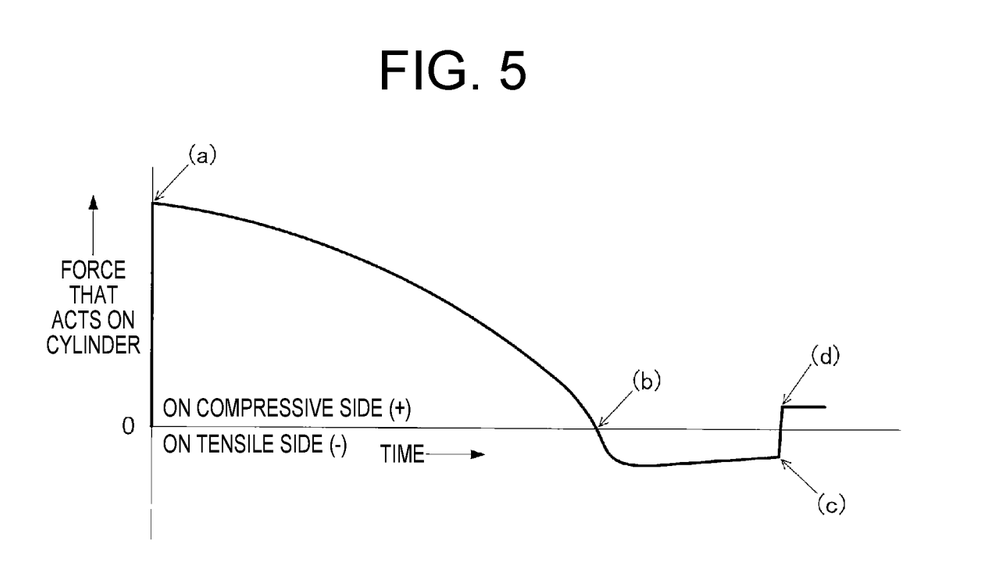
FIG. 5 is a chart showing variation of force to work on the hoist cylinder in dumping work.

To start dumping, the control lever 21 is required to be tilted to the pushing-up position PU. Hereby, the hoist cylinders 9 are extended and operation for pushing up the vessel 7 is started. At this time, the above-mentioned force of W×d1/d2 is applied to the hoist cylinders 9. Earth in the vessel 7 is moved backward by the operation for pushing up the vessel 7 and is dumped from the rear end. Therefore, the force to work on the hoist cylinders 9 varies as shown in FIG. 5.

First, in a state before the start of dumping, the vessel 7 is seated in a substantial horizontal state. When the hoist cylinders 9 are extended in this state, a load that acts on the hoist cylinders 9 is maximum at time (a) shown in FIG. 5 at which the hoist cylinders 9 start to be extended. When extension of the hoist cylinders 9 is continued and a tilt angle of the vessel 7 increases, earth in the vessel 7 slides backward, is dumped from the rear end, and weight of the load L decreases. In addition, as the vessel 7 is tilted backward, the horizontal distance d1 from the position of the hinge pin 8 to the position of the center of gravity of the vessel 7 reduces (a value of d1 decreases). Consequently, the force (W×d1/d2) that acts on the hoist cylinders 9 continuously decreases.

In this case, an extension stroke of the hoist cylinders 9 is limited to prevent impact when the extension stroke reaches a stroke end and a limit position (a maximum tilt angle) of pushing-up operation is determined to prevent the vessel 7 from turning up to a certain tilt angle or more. To enable recognizing a tilt angle of the vessel 7, an angle sensor (an angle detecting element) 40 is provided (see FIG. 3A). Accordingly, an operator can recognize a tilted state of the vessel 7 by the angle sensor 40. The angle sensor 40 is provided in the vicinity of the hinge pin 8.

An operator does not normally tilt the vessel 7 to the maximum tilt angle but stops the pushing-up operation of the vessel 7 in a position before the maximum tilt angle, and switches the control lever 21 to the holding position HL. As described above, as the dumping of earth in the vessel 7 is continued even in the holding position HL as long as the vessel 7 is kept in the tilted state, a trend that the force to work on the hoist cylinders 9 decreases as a whole continues.

In the tilted vessel 7, as shown in FIG. 2, the earth collectively moves from the front side of the vessel 7 to be turned such a state that an earth gathering spot Ws is formed in the vicinity of the rear end of the vessel 7. In this case, as the front side from the position of the hinge pin 8 of the vessel 7 is longer than the rear side, the front side is heavier on the way from the beginning of the pushing-up operation. However, when the dumping of the earth progresses and the earth gathering spot Ws moves up to the state shown in FIG. 2, that is, when balance of weight converts as shown as (b) in FIG. 5, difference in weight between the front and rear sides of the vessel 7 is eliminated and further, the rear side becomes heavier. In this state, orientation of the force to work on the hoist cylinders 9 is shifted from the compressive side to the tensile side.

Further, at time (c) at which the dumping of the earth gathering spot Ws from the rear end of the vessel 7 is completed, the force to work on the hoist cylinders 9 is only the weight of the vessel 7, at time (d) after the completion of the dumping, the above-mentioned state transfers to a state in which force on the compressive side acts on the hoist cylinders 9, and afterward, this state is unchanged.

In this case, the force to work on the hoist cylinders 9 can be detected on the basis of pressure in the oil chamber A on the head side and the oil chamber B on the rod side of the hoist cylinders 9. Therefore, as shown in FIGS. 3, 4, the pressure on the side of the oil chamber A of the hoist cylinders 9 is detected by a pressure sensor 39A (a first pressure sensor), the pressure in the oil chamber B is detected by a pressure sensor 39B (a second pressure sensor), and the pressure detected by these pressure sensors 39A, 39B is input to the controller 23.

The differential pressure calculation unit 23a in the controller 23 calculates differential pressure between the both pressure sensors 39A, 39B. The empty load determination unit 23b determines orientation (whether force on the compressive side acts or force on the tensile side acts) of force that acts in a direction in which the hoist cylinders 9 are extended or contracted on the basis of the calculation result by the differential pressure calculation unit 23a.

That is, when the area of the piston receiving pressure in the oil chamber A on the head side applied to the piston of the hoist cylinders 9 is $S_A$, the area of the piston receiving pressure in the oil chamber B on the rod side applied to the piston is $S_B$, pressure on the head side is $P_A$ and pressure on the rod side is $P_B$, the differential pressure calculation unit 23a calculates $(S_A \times P_A - S_B \times P_B)$, and determines that if the value is "positive", force on the compressive side acts and if the value is "negative", force on the tensile side acts.

A load detector according to the present invention is configured by the pressure sensors 39A, 39B and the differential pressure calculation unit 23a in this embodiment.

Normally, in a large-sized dump truck, a pair of right and left hoist cylinders 9 are provided to the vessel 7, however, as the oil chambers A, B of the two hoist cylinders 9 are respectively connected to another same oil chamber via common hydraulic piping, each one pressure sensor 39A, 39B has only to be provided.

The empty load determination unit 23b of the controller 23 determines that dumping from the vessel 7 is completed on the basis of a matter that the control lever 21 is held in the holding position HL and differential pressure of the hoist cylinders 9 converts from "negative" to "positive". To inform the operator of this, the controller 23 can instruct to light a lamp 41 for example (see FIG. 3A) and can instruct to announce from a speaker not shown. For an information device, except the lamp 41 and the speaker, a display monitor in the operator cab 6 can be also used.

As described above, according to this embodiment, an operator can immediately verify that dumping is completed and no residue is left in the vessel 7 by the lamp 41 and others in the operator cab 6 without viewing earth and others in the vessel 7. That is, in this embodiment, it can be promptly and securely detected that dumping is completed in work for dumping from the vessel 7 by determining orientation (compressive or tensile) of force to work on the hoist cylinders 9 on the basis of differential pressure of the hoist cylinders 9.

Figure 6:
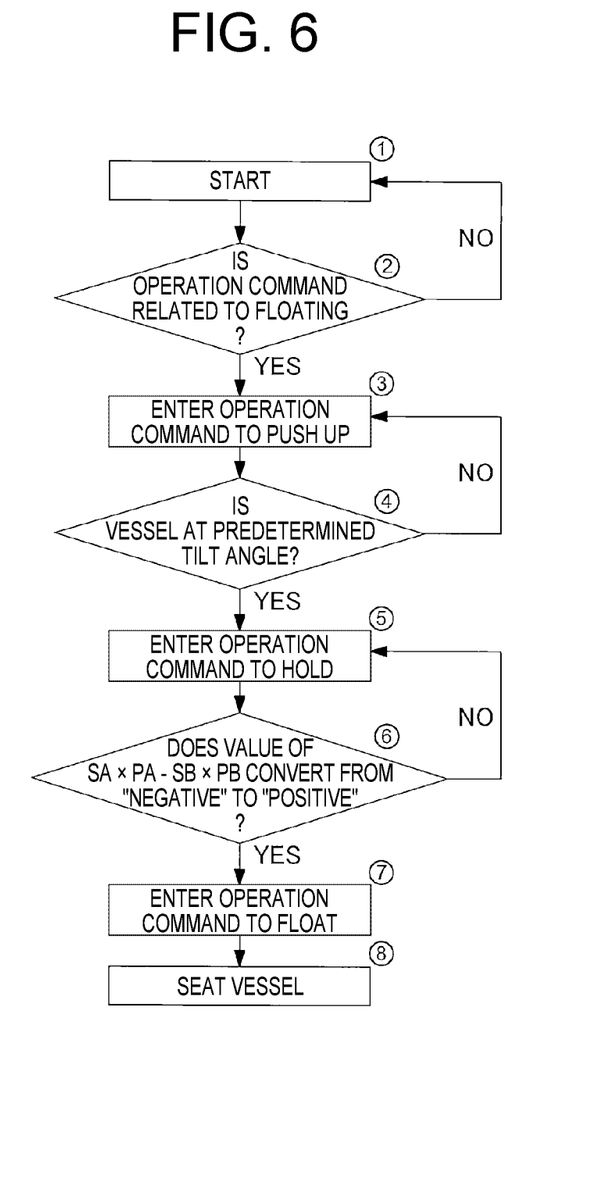
FIG. 6 is a flowchart showing a control procedure when dumping work is automated.

The case that an operator operates the control lever 21 so as to enter an operation command to tilt the vessel 7 is described above, however, the controller 23 may also control to automatically dump from the vessel 7. FIG. 6 shows a procedure thereof.

First, the controller 23 starts automatic control processing for dumping from the vessel 7 (a step 1). For example, the controller 23 starts automation of work for dumping from the vessel 7 according to various start commands such as the input from an external device of a work start command and the input from an operator in the operator cab 6 of an automatic mode switching signal.

Next, the controller 23 determines whether an operation command to the proportional solenoid valve unit 35 (the proportional solenoid valves 35PD, 35FL, 35PU) is for the floating position FL or not (a step 2). Unless the operation command is for the floating position FL (the step 2/No), no command for dumping is issued. When the operation command is for the floating position FL (the step 2/Yes), the controller 23 switches the operation command to the proportional solenoid valve unit 35 to the pushing-up position PU (pushing up operation) (a step 3). Then, the proportional solenoid valve unit 35 is operated and the vessel 7 is automatically pushed up.

As described above, it is desirable that operation for pushing up the vessel 7 is limited up to a predetermined tilt angle equal to or smaller than the maximum tilt angle. Then, the controller 23 determines whether the vessel 7 is located at the predetermined tilt angle on the basis of a signal from the angle sensor 40 or not (a step 4). When it is detected that the vessel 7 is located at the predetermined tilt angle, the controller 23 switches the operation command to the proportional solenoid valve unit 35 to the holding position HL so as to hold the tilt angle of the vessel 7 (a step 5).

While the vessel 7 is pushed up in the step 3 and next, is held in the step 5, the differential pressure ($S_A \times P_A - S_B \times P_B$) of the hoist cylinders 9 converts from a state of "positive" to a state of "negative". When dumping is completed, the differential pressure converts to the state of "positive" again (See FIG. 5). Then, in a step 6, the controller 23 (the empty load determination unit 23b) detects whether the differential pressure ($S_A \times P_A - S_B \times P_B$) converts from the state of "negative" to the state of "positive" or not and when this conversion is made, the controller (the empty load determination unit) determines that dumping from the vessel 7 is completed. That is, the empty load determination unit 23b in the controller 23 determines that dumping from the vessel 7 is completed when force to work on the hoist cylinders 9 converts from (c) to (d) in FIG. 5.

Consequently, the controller 23 switches the operation command to the proportional solenoid valve unit 35 to the floating position FL to turn the vessel 7 a floated state (a step 7) and the vessel 7 is pushed down with self-weight. When seating of the vessel 7 is detected by a seating sensor 13 provided to the vehicle frame 2, the controller 23 finishes a series of process (a step 8). Therefore, dumping work can be also made unmanned by automating dumping work from the vessel 7 and it is also excellent in safety. Besides, as the empty load determination unit 23b precisely judges an empty state of the vessel 7 even if dumping work of the vessel 7 is automated, working efficiency is not deteriorated.

Figure 7:
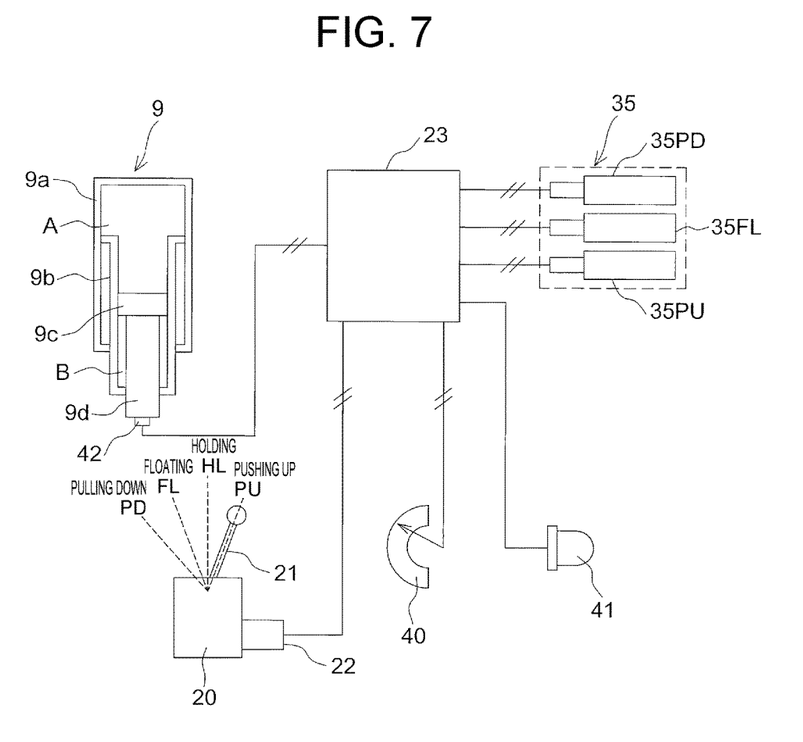
FIG. 7 shows a configuration for determining force to work on a hoist cylinder according to a second embodiment.

In the above-mentioned embodiment, it is determined on the basis of the pressure (the differential pressure) in the oil chambers whether force to work on the hoist cylinders 9 is compressive or tensile, however, force in the extended or contracted direction of the hoist cylinders 9 is directly measured by a stress detector and it may be also determined whether the force to work on the hoist cylinder is compressive or tensile. For example, as shown in FIG. 7, a strain gage (a strain sensor) 42 may be also attached to the piston rod 9d or the outer cylinder 9a so as to enable detecting the force in the extended or contracted direction, and for the hinge pin used for turnably connecting the hoist cylinders 9 to the vehicle frame 2 or the vessel 7, the pin-type load cell described in the patent literature 3 may be also used. In any case, the completion of dumping work of the vessel 7 is precisely grasped on the basis of the force to work on the hoist cylinders 9 and can be informed the operator.

The present invention is not limited to the above-mentioned embodiments and various variations are included. For example, the above-mentioned embodiments are detailedly described so as to clarify the present invention and the present invention is not necessarily limited to the embodiments provided with the described whole configurations.

REFERENCE SIGNS LIST

1 Dump truck
2 Vehicle frame
7 Vessel
9 Hoist cylinder
13 seating sensor
23 Controller
23a Differential pressure calculation unit
23b Empty load determination unit
30 Hydraulic pump
33, 34 Control valve
35 Proportional solenoid valve unit
35PD, 35PU, 35FL Proportional solenoid valve
39A Pressure sensor (First pressure sensor)
39B Pressure sensor (Second pressure sensor)
40 Angle sensor (Angle detecting element)
41 Lamp (Information device)
42 Strain gage (Strain sensor)
A Oil chamber (Oil chamber on head side)
B Oil chamber (Oil chamber on rod side)

The invention claimed is:

1. A haulage vehicle comprising:
a vehicle frame;
a vessel tiltably mounted on the vehicle frame; and
a hoist cylinder provided between the vehicle frame and the vessel, the hoist cylinder tilting the vessel;
a load detector that detects force that acts in an extended or a contracted direction of the hoist cylinder; and
an empty load determination unit that determines whether the vessel is empty on the basis of a detection signal from the load detector or not, wherein
the load detector includes: a first pressure sensor that detects pressure in an oil chamber on a head side of the hoist cylinder; a second pressure sensor that detects pressure in an oil chamber on a rod side of the hoist cylinder; and a differential pressure calculation unit that calculates differential pressure on the basis of values acquired from the first pressure sensor and the second pressure sensor, and
the empty load determination unit determines orientation of force that acts in the extended or contracted direction of the hoist cylinder on the basis of a calculation result from the differential pressure calculation unit, and determines that the vessel is empty on the basis of a matter that the orientation of the force converts from a tensile side to a compressive side.

2. The haulage vehicle according to claim 1, further comprising:
an information device that informs a result of the determination of the empty load determination unit.

3. The haulage vehicle according to claim 1, further comprising:
an angle detecting element that detects a tilt angle of the vessel; and
a controller that outputs an operation command to a proportional solenoid valve for controlling a flow rate of hydraulic oil supplied to the hoist cylinder,
wherein the controller controls the proportional solenoid valve according to input of a start command so as to instruct the hoist cylinder to execute operation for pushing up the vessel,
afterward, when the controller judges that the vessel reaches a predetermined tilt angle on the basis of detection information from the angle detecting element, the controller holds operation of the hoist cylinder so as to keep the vessel in posture at the predetermined tilt angle; and further,
when the empty load determination unit determines that the vessel is empty, the controller controls the proportional solenoid valve so as to instruct the hoist cylinder to pull down the vessel.

* * * * *